Dec. 30, 1952            C. W. OSTEN            2,623,794
ROOF STAGING APPARATUS
Filed June 15, 1949            2 SHEETS—SHEET 1
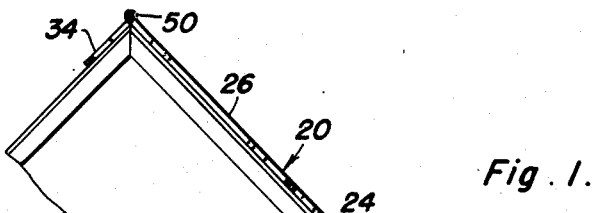
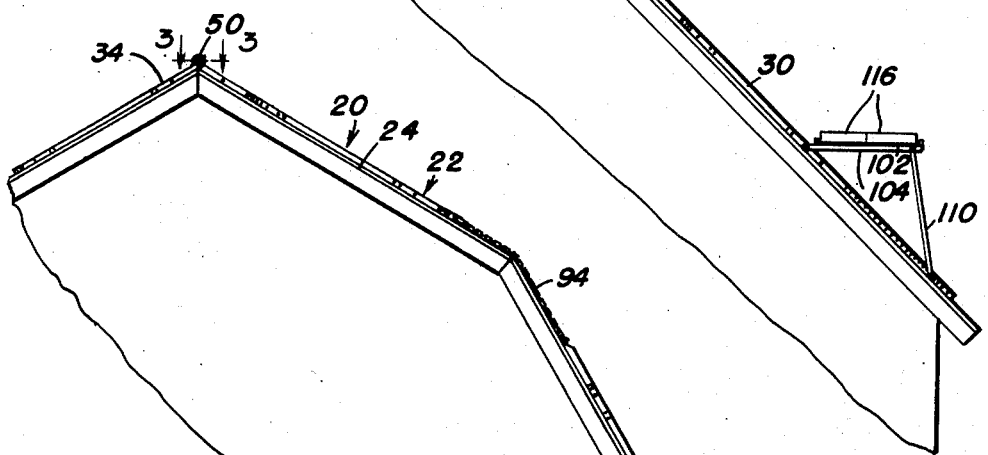
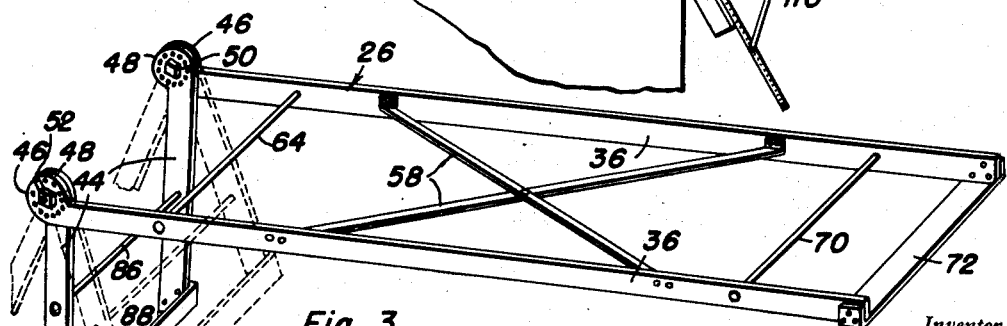
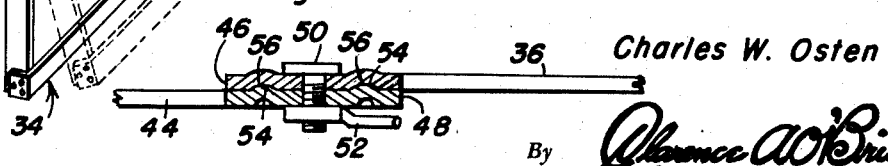
Inventor
Charles W. Osten
By Clarence A. O'Brien and Harvey B. Jacobson
Attorneys

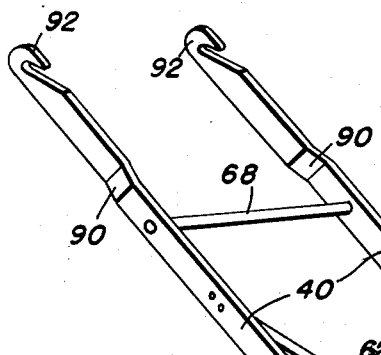
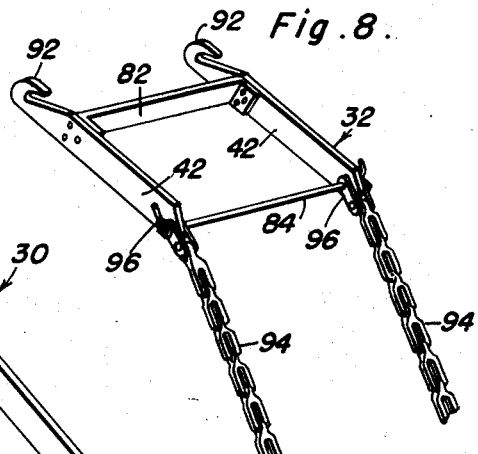
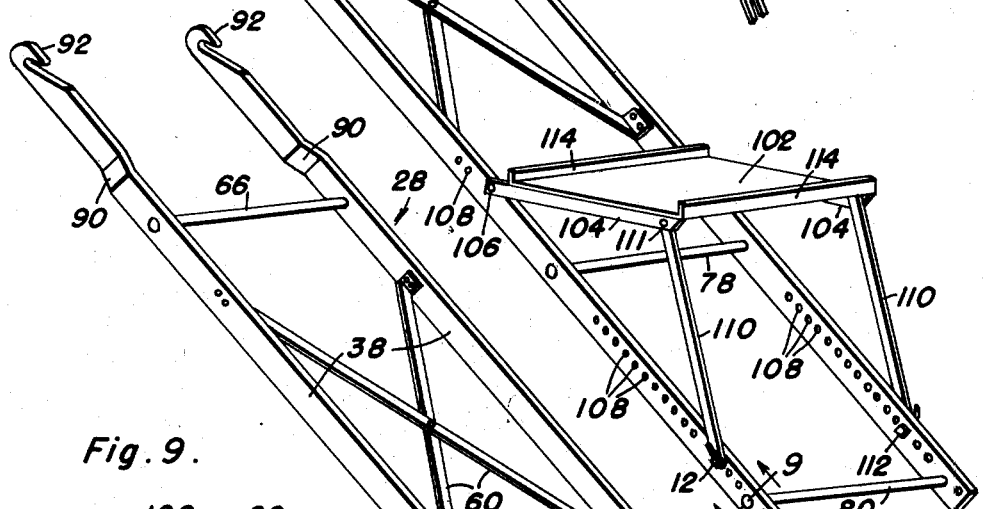
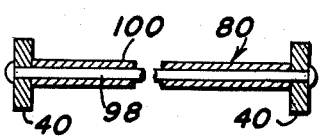
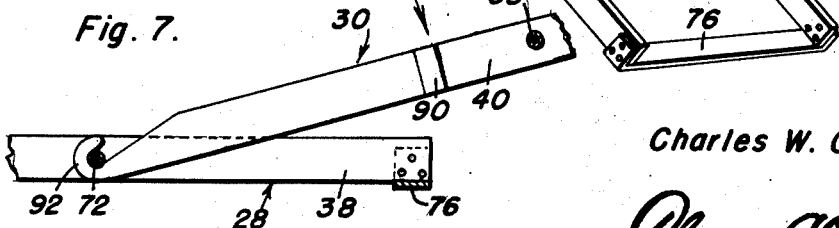

Patented Dec. 30, 1952

2,623,794

UNITED STATES PATENT OFFICE 2,623,794

ROOF STAGING APPARATUS

Charles W. Osten, San Bernardino, Calif.

Application June 15, 1949, Serial No. 99,277

2 Claims. (Cl. 304—20)

This invention relates to new and useful improvements and structural refinements in staging apparatus for use while constructing or repairing inclined roofs, and the principal object of the invention is to provide an apparatus of the character hereindescribed which, by virtue of its adjustability and interchangeability of components, is of a highly versatile nature so that it may be quickly and easily set up in conformity to different slopes and configurations of various roofs.

Some of the important features of the invention, therefore, reside in the provision and specific arrangement of the several components whereby the assembly is readily adjustable to suit the particular requirement of the job.

Some of the advantages of the invention lie in its simplicity of construction, in its rigidity, and in its adaptability to economical manufacture.

With the above more important objects and features in view and such other objects and features as may become apparent as this specification proceeds, the invention consists essentially of the arrangement and construction of parts as illustrated in the accompanying drawings, in which:

Figure 1 is an elevational view of the invention as applied to a common pitched roof.

Figure 2 is an elevational view of the apparatus applied to a "hip" roof.

Figure 3 is a cross sectional detail, taken substantially in the plane of the line 3—3 in Figure 2.

Figure 4 is a fragmentary perspective view showing the arrangement of one of the frame sections and ridge engaging member used in the invention.

Figure 5 is a perspective view of another frame section.

Figure 6 is a perspective view of still another frame section.

Figure 7 is a cross sectional detail showing the connecting means of the frame sections.

Figure 8 is a fragmentary perspective view illustrating a modified form of the connecting means, and Figure 9 is a cross sectional detail, taken substantially in the plane of the line 9—9 in Figure 5.

Like characters of reference are employed to designate like parts in the specification and throughout the several views.

Referring now to the accompanying drawings in detail, the invention consists of a roof staging apparatus designated generally by the reference character 20, the same embodying in its construction an elongated frame designated generally by the reference character 22 which is adapted to rest in an inclined position on a roof 24, as exemplified in Figures 1 and 2.

The frame 22 consists of a plurality of individual, interchangeable sections 26, 28, 30, 32, etc., which may be connected together in a selective manner, as will be hereinafter more fully described. However, it is to be noted that the upper end of the inclined frame section 26 is provided with what may be referred to as a ridge engaging member 34, whereby the entire frame is securely retained in position on the roof, as shown.

The frame sections 26, 28, 30, 32 as well as the member 34 embody in their construction pairs of spaced parallel side rails, for example, as indicated at 36 for the section 26, 38 for the section 28, 40 for the section 30, 42 for the section 32 and, finally, 44 for the member 34.

The side rails 36 of the frame section 26 are provided at their upper ends with disc-shaped extremities 46, while similar extremities 48, provided on the side rails 44 of the member 34 are placed against the extremities 46, as is best shown in Figures 3 and 4. Pivot screws 50 extend through the abutting extremities 46, 48 and are provided with handle equipped clamping nuts 52 (see Fig. 3) it being noted that the surfaces of the extremities 48 which abut the extremities 46 are formed with a plurality of dome-shaped protuberances 54 which are selectively receivable in concave depressions 56 with which the extremities 46 are provided.

By virtue of this arrangement the ridge engaging member 34 is not only pivotally connected to the frame section 26, but the angular relationship thereof to that frame section may be adjusted by simply loosening the nuts 52, so that the apparatus accommodates roof ridges of different angular magnitudes.

It may be explained at this point that the frame sections 26, 28 and 30 are provided for reinforcing purposes with crossed diagonal braces 58, 60 and 62 respectively, and also, with respective transverse bars or cross-pieces 64, 66 and 68. These bars or cross-pieces simply assume the form of rods or shafts provided with tubular sleeves for the purpose of retaining the side rails in their proper, spaced relation.

It is to be also noted that the frame section 26 is provided on its lower portion with an additional transverse bar or cross-piece 70 and with a transverse connecting strap 72, while corresponding components are provided on the frame section 28 as indicated at 74, 76, on the frame section 30 as indicated at 78, 80, on the frame section 32 as indicated at 82, 84, and finally, on the member 34 as indicated at 86, 88.

Moreover, upper end portions of the side rails of the frame sections 28, 30 and 32 are inwardly offset as typified at 90, and the upper ends of these side rails terminate in suitable hooks 92. This arrangement is such that the several frame sections may be separably and interchangeably connected together, such as for example, by engaging the hooks 92 of the section 30 with the cross-piece 70 of the section 28 (see Fig. 7) and then permitting the section 30 to be longitudinally aligned with the section 28 so that the side rails of the section 30 rest on the cross-piece 70. Needless to say, this arrangement may be employed for connecting together any two sections of the frame on either side of the roof ridge.

However, in instances where a "hip" type roof is to be worked on, as illustrated in Figure 2, the sections of the frame 22 must assume an angular relation, this being facilitated by providing a pair of flexible elements, namely, lengths of chain 94 which may be connected at one end to one section as at 96, while the hooks 92 of the adjacent section engage the remaining ends of the chain, as will be clearly understood.

It may be explained at this point that the aforementioned bars or cross-pieces 70, 74, 76, 80, etc. are best illustrated in the accompanying Figure 9, wherein it will be observed that they consist of the connecting rod 98 and the surrounding spacer sleeve 100 which maintains the side rails of the frame section in proper spaced relation.

Any one of the frame sections, for example, the section 30, may be provided with a substantially horizontal platform 102 which, in turn, is equipped at the opposite side edges thereof with a pair of flanges 104, which, in turn, are equipped with fastening elements such as bolts or screws 106 receivable selectively in rows of apertures 108 with which the side pieces 40 of the section 30 are formed.

Moreover, a pair of struts 110 are pivoted as at 111 to the flanges 104 and are provided with additional fastening elements 112 which are selectively receivable in the apertures 108, so that by simply adjusting the position of the elements 106, 112 in the apertures 108, the position of the platform 102 may be altered so that the platform is substantially horizontal notwithstanding the inclination at which the frame section 30 is disposed. The fastening elements 106, 112 are preferably employed with handle equipped nuts similar to the aforementioned nut 52.

The platform 102 is preferably provided with pairs of upstanding flanges 114, so that when the invention is used in pairs, transverse boards or planks 116 may be retained in position on the platform, as will be clearly understood.

It is believed that the advantages and use of the invention will be readily apparent from the foregoing disclosure and accordingly, further description thereof at this point is deemed unnecessary.

While in the foregoing there has been shown and described the preferred embodiment of this invention, it is to be understood that minor changes in the details of construction and arrangement of parts may be resorted to without departing from the spirit and scope of the invention as claimed.

Having described the invention, what is claimed as new is:

1. A roof staging apparatus comprising first and second elongated frame sections adapted to rest in an inclined position on a roof, said sections each including a pair of parallel side rails, a ridge engaging member on one end of said first section, a connecting strap joining the ends of the rails of said first section remote from said ridge engaging member, a cross piece joining the rails of said first section and spaced longitudinally from said connecting strap, said cross piece being spaced from the roof engaging edge of said rails of said first section, the rails of said second section each having an inwardly offset end portion receivable between the rails of the first section, hooks on the offset end portions of said rails of said second section opening in the edge of said rails opposed to the edge which engages the roof, said hooks engaging said cross piece, and said strap underlying the roof engaging edge of the rails of the second section.

2. The combination of claim 1 including a platform supporting frame attached to said second section, said frame being spaced longitudinally on said second frame section from the hooked ends thereof.

CHARLES W. OSTEN.

REFERENCES CITED

The following references are of record in the file of this patent:

UNITED STATES PATENTS

| Number | Name | Date |
| --- | --- | --- |
| 232,324 | Ashlock | Sept. 21, 1880 |
| 617,336 | Hansen | Jan. 10, 1899 |
| 786,710 | Anderson | Apr. 4, 1905 |
| 1,133,878 | Nagel | Mar. 30, 1915 |
| 1,160,721 | Kessler | Nov. 16, 1915 |
| 1,470,489 | Schuh | Oct. 9, 1923 |
| 1,894,489 | Hirose | Jan. 17, 1933 |
| 2,320,538 | Vogt | June 1, 1943 |
| 2,359,868 | Mick | Oct. 10, 1944 |

FOREIGN PATENTS

| Number | Country | Date |
| --- | --- | --- |
| 17,510 | Great Britain | 1893 |